(12) United States Patent
Berger et al.

(10) Patent No.: US 7,018,457 B2
(45) Date of Patent: Mar. 28, 2006

(54) AZO METAL-COMPLEXED DYES, INK JET INK COMPOSITIONS AND INK JET PRINTING METHODS

(75) Inventors: Michael J. Berger, Chestnut Hill, MA (US); Michael P. Filosa, Medfield, MA (US); Stephen Stroud, Medford, MA (US)

(73) Assignee: Polaroid Corporation, Waltham, MA (US)

(*) Notice: Subject to any disclaimer, the term of this patent is extended or adjusted under 35 U.S.C. 154(b) by 169 days.

(21) Appl. No.: 10/706,417

(22) Filed: Nov. 12, 2003

(65) Prior Publication Data

US 2004/0163568 A1 Aug. 26, 2004

Related U.S. Application Data

(60) Provisional application No. 60/425,650, filed on Nov. 12, 2002.

(51) Int. Cl.
 *C09D 11/02* (2006.01)
 *C09B 45/00* (2006.01)
 *B41J 2/01* (2006.01)

(52) U.S. Cl. ...................... 106/31.5; 534/710; 534/711; 347/100

(58) Field of Classification Search .............. 106/31.5; 534/710, 711; 347/100

See application file for complete search history.

(56) References Cited

U.S. PATENT DOCUMENTS

| 2,708,193 | A | * | 5/1955 | Pfitzner et al. | 534/710 |
|---|---|---|---|---|---|
| 3,994,872 | A | * | 11/1976 | Kuster | 540/132 |
| 4,029,643 | A | * | 6/1977 | Koiso et al. | 534/698 |
| 4,045,424 | A | * | 8/1977 | Tartter | 534/693 |
| 4,234,479 | A | * | 11/1980 | Mennicke et al. | 534/698 |
| 4,661,587 | A | * | 4/1987 | Schlesinger et al. | 534/696 |
| 4,824,485 | A | * | 4/1989 | Tanaka et al. | 106/31.48 |
| 4,847,365 | A | * | 7/1989 | Lienhard | 534/710 |
| 5,300,418 | A | | 4/1994 | Visconte et al. | 430/546 |
| 6,203,604 | B1 | * | 3/2001 | Kashiwazaki et al. | 106/31.5 |
| 6,527,844 | B1 | * | 3/2003 | Erdtmann et al. | 106/31.48 |
| 6,673,140 | B1 | * | 1/2004 | Tyrell et al. | 106/31.5 |
| 2004/0020405 | A1 | * | 2/2004 | Wright et al. | 106/31.5 |
| 2005/0011402 | A1 | * | 1/2005 | Kabalnov et al. | 106/31.5 |

FOREIGN PATENT DOCUMENTS

| CH | GB 1 325 507 A | 9/1970 |
|---|---|---|
| EP | 0 061 997 A | 3/1982 |
| EP | 0 947 563 A | 3/1999 |
| JP | 49-092382 | * 9/1974 |

OTHER PUBLICATIONS

Derwent abstract of JP 49-092382, Sep./1974.*
Japanese Laid-open((Kokai/unexamined) Publication No. 2-80470), Mar./1990.
Pyrazolone Dyes and Their Complexes For Use On Synthetic Fibres, I.J. Patel et al. J. Inxt. Chemists (Index), vol. 71, Part 5, 1999, pp 185-186, no month available.

* cited by examiner

*Primary Examiner*—Helene Klemanski

(57) ABSTRACT

There are described metal-complexed azo dyes which are useful in ink jet printing applications. Also described are ink jet ink compositions including a dye of the invention as well as ink jet printing methods and apparatus.

13 Claims, No Drawings

AZO METAL-COMPLEXED DYES, INK JET INK COMPOSITIONS AND INK JET PRINTING METHODS

REFERENCE TO RELATED APPLICATION

This application claims the benefit of prior provisional application Ser. No. 60/425,650, filed Nov. 12, 2002.

FIELD OF THE INVENTION

This invention relates to metal-complexed azo dyes and to printing ink compositions for use in ink jet printers. More specifically, this invention relates to certain metal-complexed azo dyes and to ink jet ink compositions which include metal-complexed azo dyes, or their salts, which possess a combination of characteristics rendering them especially useful in such inks. The invention also relates to ink jet printing methods.

BACKGROUND OF THE INVENTION

Ink jet printers are commonly used as hard copy output devices for computers. Such printers form an image by using a plurality of nozzles to form a stream of droplets of an ink and to direct those droplets on to a sheet of an ink receiving medium (typically a surface-treated paper), thus forming the image. The image may be a monochrome image, formed using a single, normally black, ink, or a full color image, formed using at least three inks of differing colors sprayed from a set of three separate nozzles. Some contemporary ink jet printers are capable of producing color images of photographic or near-photographic quality, and are often used by graphic artists to obtain rapid color proofs of illustrations which closely simulate the color illustration which will eventually be produced on a conventional printing press. Ink jet printers can also make use of more than four inks (for example, eight color CCMMYYKK printers are produced commercially) by providing the appropriate number of sets of nozzles, and permit relatively easy use of custom-blended inks when such custom inks are required for particular jobs.

Although so-called "solid ink jet" printers are known using "inks" which are solid at room temperature and which are melted before being sprayed in the liquid state, most ink jet printers are of the so-called "liquid ink jet" type and use inks which are liquid at room temperature. Such inks typically comprise a dye dissolved, or dispersed, in a solvent or suspension medium. The solvent or medium may be organic, but organic solvents are generally not favored because of environmental and toxicity problems, and hence most solvents or suspension media are aqueous, although they may contain an alcohol or a glycol as a co-solvent. Liquid inks may also contain other additives, such as stabilizers, viscosity modifiers, surfactants, bactericides, fungicides etc.

The dyes used in such liquid inks must satisfy numerous requirements. In order to produce images with the wide range of colors and highly saturated colors demanded by graphic artists, the dyes should have high extinction coefficients and good color. The dyes need to be highly soluble (or dispersible) in the solvent or carrier medium used, since an insufficiently soluble dye requires spraying an excessive amount of solvent with the dye, thus leading to undesirably slow drying of the image on the receiving sheet. The dye solution must be stable over the wide ranges of temperature and humidity likely to be encountered during distribution and storage of the ink, since even modest precipitation of solid dye crystals from the solution/dispersion will be disastrous because the narrow nozzles are readily clogged by such crystals. Finally, the color of the dyes, and thus of the image, must be essentially unaffected by (a) chemical reactions between the dye and any one of the variety of receiving sheets on which the image may be formed; (b) chemical reactions between the dye and any other dyes used to form the same image (in color ink jet printing, drops of the various colored inks inevitably come into contact on the receiving sheet, especially in areas of high color density); (c) air oxidation of the final image; and (d) photochemical reactions when the image is exposed to radiation. For obvious reasons, a graphic artist does not want a proof prepared for a client to undergo noticeable fading or color shifts simply because the client leaves the proof exposed on a desktop under office fluorescent lighting, or takes the proof outdoors for a short time in order to view it in daylight.

All these requirements tend to produce dyes which are a compromise, excellence in one property being sacrificed for acceptable behavior in another. In particular, many commercial ink jet dyes have less photostability than is desirable, and are subject to significant fading when exposed to office fluorescent lighting for lengthy periods.

Various pyrazolone dyes are known in the art. Patel et al., in Pyrazolone Dyes and Their Complexes For Use On Synthetic Fibers, J. Institute of Chemistry (India), (1999) teach certain metal complexed pyrazolone dyes for use in dyeing textiles.

As the state of the art advances and efforts are made to provide new ink jet recording systems which can meet new performance requirements and to reduce or eliminate some of the aforementioned undesirable characteristics of the known systems it would be advantageous to have new dyes which are useful in ink jet ink compositions and new ink jet ink compositions which can provide images which exhibit enhanced stability to light and ozone.

SUMMARY OF THE INVENTION

It is therefore an object of this invention to provide novel metal-complexed azo dyes.

It is another object to provide novel printing ink compositions.

It is another object of the invention to provide printing ink compositions which are useful in ink jet imaging applications.

Another object of the invention is to provide printing ink compositions which include metallized azo dyes.

A further object of the invention is to provide ink compositions for use in ink jet imaging applications which can provide appropriate chroma and hue angle on a variety of receiver materials.

Still another object of the invention is to provide ink jet imaging methods.

These and other objects and advantages are accomplished in accordance with one embodiment of the present invention by providing printing ink compositions which comprise metallized azo dyes, or salts thereof. The dyes may be 1:1 metal complexes or 2:1 metal complexes.

The 1:1 metal complexed dyes are represented by formula I illustrated below

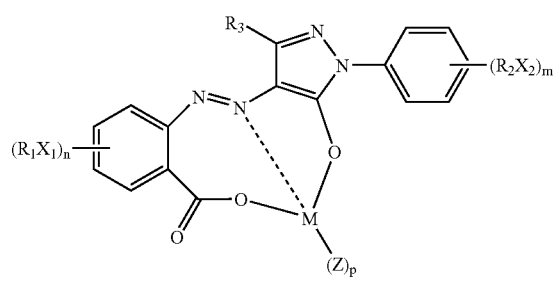

(I)

wherein
M is a metal such as, for example, copper, chromium, cobalt, nickel or the like;
$R_1$ and $R_2$ each independently is a solubilizing group such as, for example, sulfonate ($SO_3^-$), carboxylate ($COO^-$), $SO_2NH(CH_2)_3N^+(R_4)_3$, or the like, where $R_4$ is alkyl having from 1 to 3 carbon atoms;
$R_3$ is selected from the group consisting of:
  (1) alkyl, preferably having from 1 to 6 carbon atoms,
  (2) cyano;
  (3) COOH; and
  (4) $CONH_2$;
$X_1$ and $X_2$ each independently is a counterion which may be a cation such as, for example, an alkali metal such as lithium, sodium or potassium or a quaternary ammonium moiety or an anion such as a halogen, for example, chloride or bromide or an alkyl sulfonate;
Z is a ligand which may be $H_2O$ or a solvent such as an aqueous alcohol, e.g., methanol, an aqueous glycol, acetonitrile, dimethylformamide or the like;
n is an integer of from 1 to 3;
m is an integer of from 1 to 3; and
p is an integer of from 1 to 3.

The 2:1 metal complexed dyes are represented by formula II illustrated below

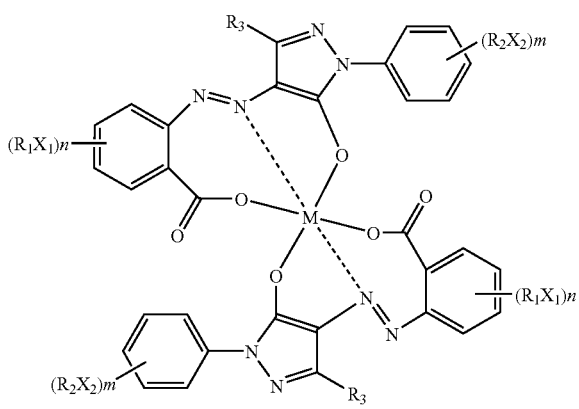

(II)

wherein M, $R_1$, $R_2$, $R_3$, $X_1$, $X_2$, m and n are as previously defined.

The ink jet ink compositions of the invention comprise a solution of at least one dye of the invention in a suitable vehicle such as water, aqueous alcohol, aqueous glycol, etc. The invention also includes an ink jet cartridge comprising a housing having walls defining a reservoir and an outlet opening, the cartridge containing an ink composition of the present invention.

There are also provided according to the invention, ink jet printing methods comprising forming a plurality of droplets of an ink composition of the invention, and directing these droplets onto a receiver material to form an image thereon.

In another embodiment of the invention there are provided novel metal-complexed azo dyes which are represented by the formula

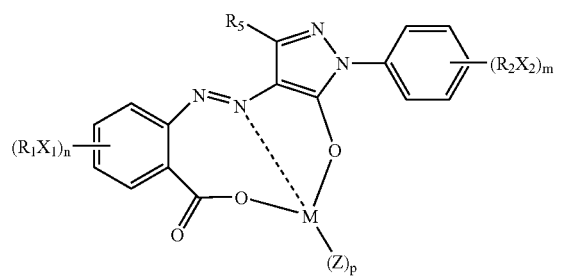

(III)

where $R_5$ is alkyl, preferably having from 1 to 6 carbon atoms, and particularly preferably methyl; and M, $R_1$, $R_2$, $X_1$, $X_2$, Z, m, n and p are as previously defined.

DESCRIPTION OF THE PREFERRED EMBODIMENTS

A particularly preferred compound of the invention is a yellow dye represented by the formula

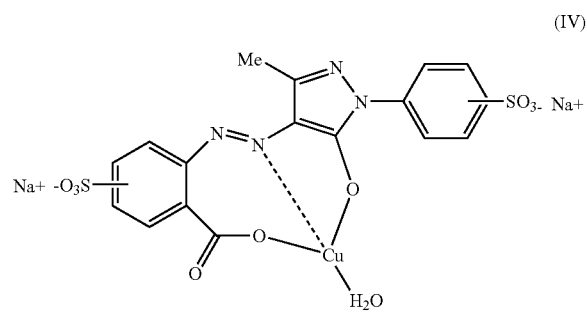

(IV)

The dye of formula IV, when utilized in ink jet printing ink compositions, has been found to provide images on various ink jet receiver materials which exhibit good luminance, chroma and hue and good light stability and resistance to ozone. Thus, a particularly preferred ink jet ink composition of the invention includes a dye represented by formula IV.

Other preferred compounds according to the invention are those represented by formulas V–XV, which are within formula I, as illustrated in Table I.

TABLE I

| Formula | $R_1$ | $R_2$ | $R_3$ | M | X |
|---|---|---|---|---|---|
| V | 4-$SO_3Na$ | 4-$SO_3Na$ | $CH_3$ | Ni | $H_2O$ |
| VI | 4-$SO_3Na$ | 4-$SO_3Na$ | $CH_3$ | Co | $H_2O$ |
| VII | 5-COOH | 4-$SO_3Na$ | $CH_3$ | Cu | $H_2O$ |
| VIII | 5-COOH | 4-$SO_3Na$ | $CH_3$ | Ni | $H_2O$ |
| IX | 5-COOH | 4-$SO_3Na$ | $CH_3$ | Co | $H_2O$ |
| X | 3-COOH | 4-$SO_3Na$ | $CH_3$ | Cu | $H_2O$ |
| XI | 3-COOH | 4-$SO_3Na$ | $CH_3$ | Ni | $H_2O$ |
| XII | 3-COOH | 4-$SO_3Na$ | $CH_3$ | Co | $H_2O$ |
| XIII | 4-$SO_3Na$ | 4-$SO_3Na$ | COOH | Cu | $H_2O$ |
| XIV | 4-$SO_3Na$ | 4-$SO_3Na$ | COOH | Ni | $H_2O$ |
| XV | 4-$SO_3Na$ | 4-$SO_3Na$ | COOH | Co | $H_2O$ |

As will be apparent to those skilled in the art, the solubility of the salts of the compounds of formulas I–XV is greatly influenced by the choice of cation. The preferred cations for use in the salts are alkali metals, particularly sodium. Mixed alkali metal salts can of course be used if desired. However, relatively water-insoluble salts of the invention may be useful as intermediates in the preparation of more soluble salts.

A preferred ink jet ink composition of the invention includes a dye of formulas I and III wherein the metal (M) is copper, and its salts, especially its alkali metal salts; the particularly preferred salt being the disodium salt. This disodium salt has been found to have a combination of properties, including high solubility and high photostability, which render it especially advantageous for use as a yellow dye in ink jet inks.

The dyes of formulas I–XV can be formulated into aqueous inks using the conventional techniques which are well known to those skilled in the preparation of such inks. For example, the ink may contain an alcohol or a glycol as a co-solvent, although the present dyes are sufficiently water-soluble that the use of co-solvents is unnecessary. The inks may contain any of the conventional additives, such as stabilizers, viscosity modifiers, bactericides, fungicides etc.

The metal-complexed dyes of formulas I–XV can be prepared by various synthetic procedures which will be apparent to those skilled in the art from the discussion which follows and the specific examples provided below herein. In one preferred synthetic scheme a solution of a sulfonated anthranilic acid and sodium nitrite in an acid such as concentrated hydrochloric acid (to form a diazonium salt) is initially reacted with a solution of an appropriate pyrazolone compound and sodium acetate in water to form the uncomplexed azo dye compound which is then isolated. Subsequently, there is added to a solution of the azo dye and an alkali-metal acetate, such as sodium acetate, in water a metal sulfate (or other appropriate metal salt such as acetate, chloride, etc.) compound such as copper (II) sulfate to form the desired metal-complexed dye of the invention. In another process for the preparation of the dyes of the invention, a metal sulfate compound can be added directly to an ink jet fluid containing the uncomplexed azo dye thus preparing the metal-complexed dye of the invention in situ with the attendant advantage of fewer process steps thus providing overall less expensive ink jet ink fluids.

Full color ink jet printing requires the use of a set of at least three different inks, typically at least yellow, cyan and magenta inks. The inks of the present invention typically have a very attractive yellow color. It is well known to those skilled in the art of ink jet printing that, to obtain attractive colors in the printed images and the wide color gamut that customers, particularly those engaged in the graphic arts industry, demand it is important to select the dyes within a set so as to obtain the best color rendition and gamut, and to ensure that the dyes do not interact adversely with each other after they have been printed on a receiver surface. For these reasons, it has been found desirable, when the dyes of the invention are used as the yellow dye of an ink jet dye set, to use as the magenta dye of the set a copper complex of a 1-[phenylazo]naphthalene compound, or a salt thereof, in which each of the naphthalene and phenyl groups carries a hydroxyl group ortho to the azo group, at least one of thenaphthalene and phenyl groups carrying at least one sulfonic acid group. An especially preferred magenta dye of this type is 3-hydroxy-4-[[2-hydroxy-5-sulfophenyl]azo]-2, 7-naphthalenedisulfonic acid, or salt thereof. These compounds are described in Japanese Published Patent Application (Kokai) No. 02-080470.

The formulation of ink compositions of the invention, and the printing apparatus and methods used to carry out ink jet printing, can be effected using techniques which are well known in the art. Thus, the dyes of formula I can be formulated into aqueous ink compositions using conventional techniques which are well known to those skilled in the preparation of such ink compositions. For example, the ink composition may contain an alcohol or a glycol as a co-solvent although the present dyes are sufficiently soluble in water such that the use of such co-solvents is not necessary. The ink compositions may contain any suitable additives. Typical additives for such compositions include stabilizers, viscosity modifiers, bactericides, fungicides, etc. Typically, a measured quantity of each ink composition is placed in a separate ink jet cartridge comprising a housing having walls defining a reservoir for the ink and an outlet through which the ink leaves the cartridge and flows to a printhead (typically of the thermal or piezoelectric type) which provides a stream of droplets of the ink and directs these droplets to a receiver surface, which typically is a paper sheet.

EXAMPLES

The invention will now be described further in detail with respect to specific preferred embodiments by way of examples, it being understood that these are intended to be illustrative only and the invention is not limited to the materials, procedures, amounts, conditions, etc., recited therein. All parts and percentages recited are by weight unless otherwise specified.

Example I

This example describes the synthesis of the compound of formula IV.

A sulfonated anthranilic acid, 2-amino-5-sulfo-benzoic acid, (8 g, 36.8 mmol) and sodium nitrite were dissolved in distilled water (100 mL) and 14.4 g of concentrated HCL were added. The solution was stirred for 15 minutes during which time a white precipitate formed.

A. In a second flask, 3-methyl-1-(4-sulfophenyl)-2-pyrazo;in-5-one (9.6 g, 37.2 mmol) and sodium acetate (35 g, 0.33 mole) were dissolved in distilled water (150 mL) and the diazonium salt mixture was added to the pyrazolone solution dropwise over about 15 minutes. The mixture was allowed to stand overnight at 25° C. followed by filtration to recover the solid 2-[5-hydroxy-3-methyl-1-(4-sulfophenyl)-1H-pyrazol-4-yl azo]-5-sulfobenzoic acid sodium salt (17 g, 89% yield).

B(1). The azo dye (10 g, ~0.02 mole) and sodium acetate (5 g, ~0.06 mole) were dissolved in distilled water (100 mL) and copper(II) sulfate (5 g, 0.02 mole) was added to the solution followed by stirring until all the copper salt was in solution. The mixture was allowed to stand overnight during which time the product crystallized. The solid product was recovered by filtration, washed with methanol and dried at 60° C. to yield 8 g of a green solid.

B(2). Step B was also carried out a second time as follows: The azo dye (10 g, ~0.02 mole) and sodium acetate (5g, ~0.06 mole) were dissolved in distilled water (100 mL) and copper(II) sulfate (5 g, 0.02 mole) was added to the solution followed by stirring until all the copper salt was in solution. The mixture was allowed to stand overnight. Methanol (25 mL) was added and the mixture again allowed to stand overnight. The solid was recovered by filtration and the resulting wet cake was dissolved in a hot water/methanol (80/20 by volume) solution and allowed to cool overnight. The solid was recovered by filtration, washed with methanol and dried at 60° C. to yield a green solid (5.7 g) An additional amount of solid (3 g) was obtained by adding additional methanol to the filtrates.

The product was shown to be about 80% complexed by HPLC experiments carried out in distilled water (pH 6) at room temperature. The molecular weight of the dye was found by mass spectrometry to be 587.7 which is consistent with a 1:1 complexed structure. The dye was found to have a water solubility of 12.9 mg/mL which is suitable for aqueous ink jet ink formulations and an extinction coefficient ($\epsilon$)=24,588.

Example II

This example illustrates the light stability of an uncomplexed azo dye and two metal-complexed dyes of the invention on three different receiver materials.

The uncomplexed azo dye (Control) was the product of Step A of Example I. Metal-complexed Dyes 1 and 2 according to the invention were 20% and 80% copper complexed compounds of formula IV, respectively.

Experiments were carried out with Kodak® Premium Glossy Paper (available from Eastman Kodak Company, Rochester, N.Y.), Epson Premium Glossy Photo Paper (available from Epson Corporation) and Somerset Radiant White watercolor paper (a 100% cotton fiber paper with little or no sizing).

The dye samples were prepared by initially making a concentrated ink jet fluid (Fluid A) with 35.2% 1,5-pentanediol, 24.8% 2-pyrollidinone, 20% trimethylolpropane and 20% water (by weight). Two parts by weight of Fluid A were diluted with eight parts of water to form Fluid B consisting of approximately 7% 1,5-pentanediol, 5% 2-pyrollidinone, 4% trimethylolpropane and 84% water.

The test fluids were prepared by dissolving approximately 20 mg of dye with heating and vortex stirring into 1 gram of Fluid B. Once a clear fluid was obtained, the fluid was coated on the ink jet receiver material with a #4 Meyer rod. The coating was dried and the reflection density was measured. When the density was not in the range of from 0.7 to 1.3 the test fluid was diluted with additional Fluid B and the coatings repeated until the reflection density was in the range specified above.

Samples of the dyes were applied to the papers in a thin film as described above, air dried and the sample exposed in a Xenon arc at 10,000 ft. candles and also to cool white fluorescent bulbs with an irradiance of 2,500 ft. candles. The results are shown in Tables II and III.

TABLE II

% Density Loss (Y) after 5 Day Xe Arc

| Dye | % Cu | Watercolor | Kodak | Epson |
|---|---|---|---|---|
| Control | 0 | −23 | −85 | −7 |
| 1 | ~20 | −11 | −31 | 8 |
| 2 | 80 | −5 | −17 | 1 |

TABLE III

% Density Loss after 3 weeks under fluorescent light

| | | Paper type | | |
| Dye | % Cu | Watercolor | Kodak | Epson |
|---|---|---|---|---|
| Control | 0 | −7% | −51% | 1% |
| 1 | 20 | −2% | −15% | 1% |
| 2 | 80 | −1% | −9% | 1% |

It can be seen that Dyes 1 and 2 of formula IV had significantly better light stability than the uncomplexed azo dye with respect to all three receiver materials. Further, it can be seen that between Dyes 1 and 2, Dye 2 which had the higher amount of copper complexation, had better light stability.

Example III

This example illustrates the light stability of the dyes of formulas V–XV in xenon arc testing. The tests were carried out as described in Example II. The results are shown in Table IV.

TABLE IV

% Density Loss (Y) after 5 Day Xe Arc

| Dye | Watercolor | Kodak | Epson |
|---|---|---|---|
| V | −17 | −65 | 19 |
| VI | −19 | −52 | 17 |
| VII | −10 | −51 | 7 |
| VIII | 2 | −56 | −4 |
| IX | −10 | −53 | 3 |
| X | −47 | −67 | 7 |
| XI | −11 | −11 | 9 |
| XII | −58 | −81 | 5 |
| XIII | −2 | −10 | −1 |
| XIV | 0 | −2 | 4 |
| XV | −3 | −13 | −2 |

Example IV

This example illustrates the stability to ozone of four dyes, namely the Control and three metal-complexed dyes according to the invention, each having a different metal ion as shown in Table V. Dye 2 has been described previously. Dyes 3 and 4 were nickel and cobalt complexed dyes, respectively, of formula IV The ozone tests were conducted in an ozone chamber constructed from a large Pyrex jar having a volume of approximately 1.2 ft.$^3$ and a low temperature mercury-argon lamp (Oriel 6035). Ozone was produced in situ by the direct photolysis of oxygen in the ambient air within the chamber. A fan in the chamber ensured that all the samples were uniformly exposed to the ozone. The lamp power supply was energized under the control of a timer such that the lamp was on for 15 minutes every two hours thereby producing an average ozone concentration of about 10 PPM (24 mg/m$^3$). The test was carried out for 16 hours, or 8 lamp cycles. The ozone tests were carried out on Epson paper. The light stability experiments were carried out for 5 days at 10,00 ft. candles on Kodak Glossy Paper.

TABLE V

| Dye | Metal ion | % Loss in Density | |
| --- | --- | --- | --- |
| | | Ozone | Light |
| Control | None | −29% | −90% |
| 2 | Cu | −21% | −17% |
| 3 | Ni | −32% | −65% |
| 4 | Co | −27% | −52% |

Typically, images formed on microporous media such as, for example, Epson Premium Glossy Photo Paper which utilize silicas or titania to effect rapid dry performance are more susceptible to attack by ozone and other atmospheric contaminants. One possible explanation for this phenomenon is that the high surface area and the oxide surface of such mocroporous media offer catalytic sites for oxidation by ozone. Images on watercolor paper or Kodak Premium Glossy Paper typically do not exhibit as much susceptibility to ozone attack.

It can be seen from the results shown in Table V that Dye 2, the copper-complexed dye, had a slightly better resistance to ozone than the uncomplexed control azo dye and better ozone performance than Dyes 3 and 4, the nickel- and cobalt-complexed dyes of the invention. The results also show that Dyes 2–4, the three metal-complexed dyes of the invention, exhibited better light stability than the control with Dye 2, the copper-complexed dye, exhibiting the best light stability.

Example V

This Example describes experiments carried out to compare the luminance (L*), chroma (c*) and hue (h*) of images formed on various receiver materials with Dye 2 of the invention with those of current commercially available digital printing systems.

The commercially available printing systems were tested by using a digital file of a step-wedge color test target. The test fluid including Dye 2 of the invention was prepared as described in Example II and was applied to the various receiver papers as described in that example.

The densitometry and colorimetry measurements were made on a Gretag MacBeth SMP-50 densitometer which provided the L*, c* and h* as part of the measurement of the reflection density. These numbers were then tabulated and compared with commercial yellow dyes.

TABLE VI

| System | L* | c* | h* |
| --- | --- | --- | --- |
| HP P1000 | 88 | 61 | 100 |
| Epson 870 | 91 | 56 | 103 |
| Fuji Thermal Autochrome | 84 | 61 | 97 |
| Sony D2T2 | 93 | 63 | 106 |
| Noritsu RA4 | 84 | 50 | 95 |

TABLE VI-continued

| System | L* | c* | h* |
| --- | --- | --- | --- |
| Shinko D2T2 | 93 | 68 | 106 |
| Dye 2/Epson Paper | 90 | 62 | 102 |
| Dye 2/Kodak Paper | 88 | 57 | 99 |
| Dye 2//Watercolor | 90 | 68 | 96 |

It can be seen that the copper-complexed dye of the invention exhibited luminance, chroma and hue values which are comparable to those obtained from the commercially available systems.

Example VI

This example describes experiments carried out to compare the luminance (L*) of images formed on Epson 870 paper with Dye 2 of the invention with those images formed on Epson 870 paper with the dyes of formulas IV–VIII and XIII–XV. The luminance values, including the a* and b*, values were obtained as described in Example V.

TABLE VII

| Formula | L* | a* | b* |
| --- | --- | --- | --- |
| Dye 2 | 90 | | |
| IV | 87 | −9 | 78 |
| V | 86 | −5 | 83 |
| VI | 88 | −8 | 81 |
| VII | 88 | −11 | 79 |
| VIII | 87 | −10 | 78 |
| XIII | 85 | −7 | 88 |
| XIV | 82 | 1 | 89 |
| XV | 81 | 2 | 86 |

These data show that the images formed with the dyes of formulas IV–VIII and XIII–XV were comparable to that formed with the dye of formula IV.

Although the invention has been described in detail with respect to various preferred embodiments, it is not intended to be limited thereto, but rather those skilled in the art will recognize that variations and modifications are possible which are within the spirit of the invention and the scope of the appended claims.

What is claimed is:

1. A printing ink composition comprising a metal-complexed dye represented by the formula

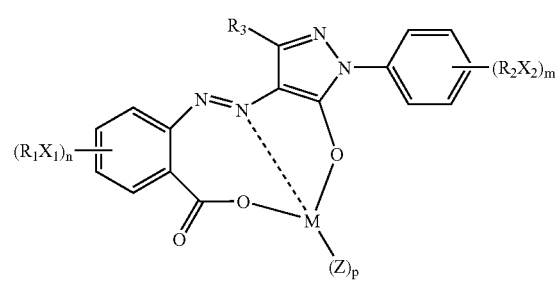

or a salt thereof
wherein:
M is copper;
$R_1$ and $R_2$ each independently is a solubilizing group;
$R_3$ is selected from the group consisting of:

(1) alkyl;
(2) cyano;
(3) COOH; and
(4) CONH2;

$X_1$ and $X_2$ each independently is a counterion;

Z is a ligand;

n is an integer of from 1 to 3;

m is an integer of from 1 to 3; and p is an integer of from 1 to 3;

dissolved or dispersed in a liquid carrier.

2. The printing ink composition according to claim 1 wherein said liquid carrier comprises water.

3. The printing ink composition according to claim 1, wherein at least one of $X_1$ and $X_2$ is an alkali metal ion.

4. The printing ink composition according to claim 1 which includes a dye represented by the formula

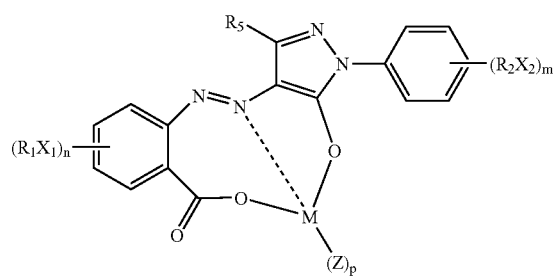

wherein $R_5$ is alkyl and M, $R_1$, $R_2$, $X_1$, $X_2$, Z, m, n and p are as defined in claim 1.

5. The printing ink composition according to claim 1 which includes a dye represented by the formula

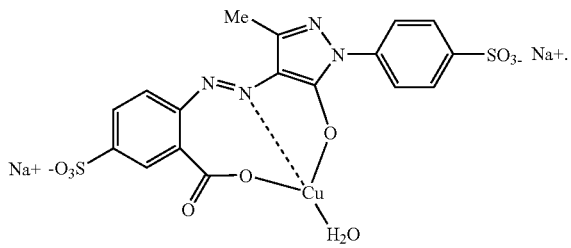

6. An ink jet ink comprising a solution of a dye according to claim 1 in water, aqueous alcohol or an aqueous glycol.

7. A printing ink composition comprising a metal-complexed dye represented by the formula

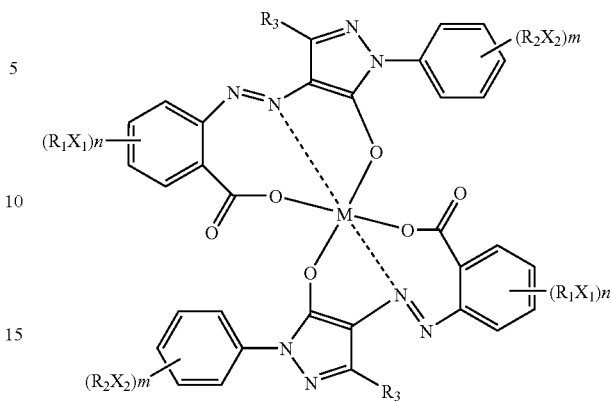

wherein:

M is copper;

$R_1$ and $R_2$ each independently is a solubilizing group;

$R_3$ is selected from the group consisting of:
(1) alkyl;
(2) cyano;
(3) COOH; and
(4) $CONH_2$;

$X_1$ and $X_2$ each independently is a counterion;

n is an integer of from 1 to 3; and m is an integer of from 1 to 3;

dissolved or dispersed in a liquid carrier.

8. The printing ink composition according to claim 7 wherein said liquid carrier comprises water.

9. The printing ink composition according to claim 7 wherein at least one of $X_1$ and $X_2$ is an alkali metal ion.

10. An ink jet cartridge comprising a housing having walls defining a reservoir and an outlet opening, the cartridge containing an ink jet ink according to claims 1 or 7.

11. An ink jet printing method comprising forming a plurality of drops of an ink composition, and directing said drops onto an ink receptive material to form an image thereon, wherein said ink composition is according to claims 1 or 7.

12. A metal-complexed dye represented by the formula

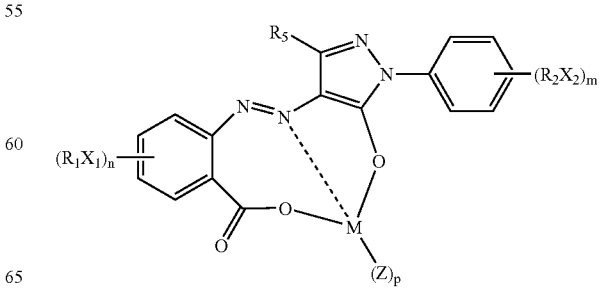

where
- M is copper;
- $R_1$ and $R_2$ each independently is a solubilizing group;
- $R_5$ is alkyl cyano, COOH or $CONH_2$;
- $X_1$ and $X_2$ each independently is a counterion;
- Z is a ligand;
- n is an integer of from 1 to 3;
- m is an integer of from 1 to 3; and
- p is an integer of from 1 to 3.

13. A metal-complexed dye according to claim 12 wherein $R_5$ is methyl.

* * * * *